April 30, 1929.  G. F. HOCHRIEM  1,710,980
WEIGHING AND PRINTING MACHINE
Filed May 13, 1927   2 Sheets-Sheet 1

Gustav F. Hochriem INVENTOR
BY
Pennie, Davis, Marvin & Edmonds
ATTORNEY

April 30, 1929.  G. F. HOCHRIEM  1,710,980
WEIGHING AND PRINTING MACHINE
Filed May 13, 1927   2 Sheets-Sheet 2
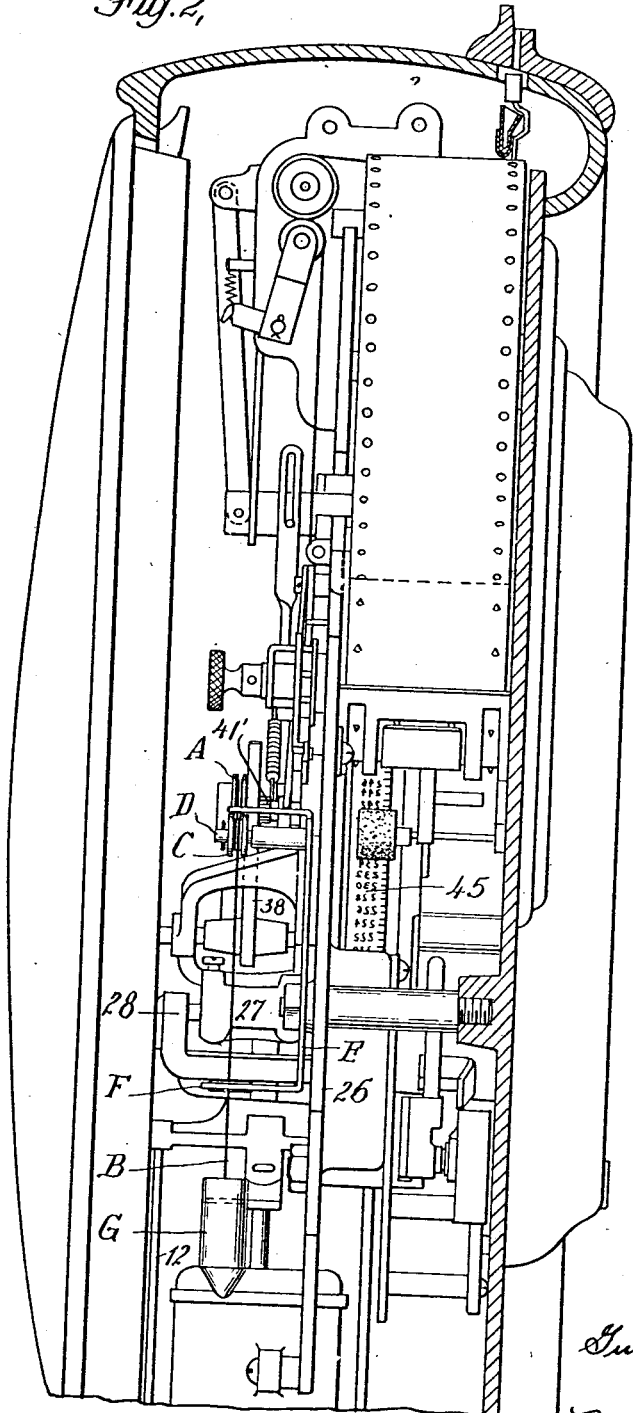
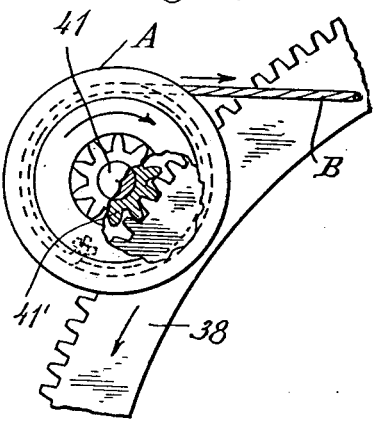
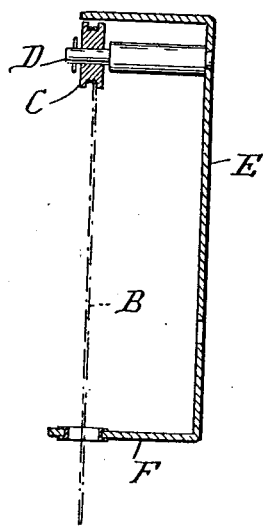
INVENTOR
Gustav F. Hochriem
BY
ATTORNEY Patented Apr. 30, 1929.

1,710,980

UNITED STATES PATENT OFFICE.

GUSTAV F. HOCHRIEM, OF CHICAGO, ILLINOIS, ASSIGNOR TO RHODES-HOCHRIEM MANUFACTURING COMPANY, OF CHICAGO, ILLINOIS, A CORPORATION OF ILLINOIS.

WEIGHING AND PRINTING MACHINE.

Application filed May 13, 1927. Serial No. 191,242.

This invention relates to weighing and printing mechanism, and has for its object the provision of means for insuring accurate positioning of the printing wheel notwithstanding unavoidable lost motion in the operating connections.

More particularly the invention provides an improvement on the weighing and ticket-printing machine described in my co-pending application Ser. No. 135,316, filed September 14, 1926, the improvement, however, being adaptable to other machines of the same general type. In weighing and ticket-printing machines such as described in my above-mentioned application, the printing is accomplished by means of a printing wheel carrying on its periphery a series of numbers representing the different weights to be printed, with intermediate divisions showing fractions between the successive numbers. This printing wheel is connected to the scale platform through a suitable operating mechanism embodying a rack and pinion so as to be turned from its zero position through a partial rotation to an extent depending upon the movement of the scale platform under the weight of the individual being weighed.

It is highly important that the motion transmitting means, particularly the rack and pinion, be freely movable, as otherwise the resistance to movement will interfere with the accurate movement of the scale platform, as will be obvious. In order for the pinion to be freely movable it is necessary that a certain amount of play be allowed in the teeth of the rack and pinion, and as the printing wheel is mounted on ball bearings and is accurately balanced and of considerable weight, it tends to oscillate through the arc permitted by the play in the rack and pinion gear for a few moments before coming to rest, and may come to rest with either the driving side of the teeth or the reverse side in contact.

As it is customary to provide printing wheels of scales of this kind with numbers running from zero to 300, it only requires one-six hundredth of a revolution to make half a pound difference in the weight printed on the ticket, and as a lost motion to this extent is unavoidable in the gear connections, accuracy within smaller limits than one-half pound has heretofore been impossible.

By the invention of this application this degree of accuracy is greatly increased while still allowing the necessary lost motion in the printing wheel connections to avoid resistance to the free movement of the scale beam.

In the accompanying drawings and following specification I have shown and described my improvement applied to the printing and weighing mechanism disclosed in my aforementioned co-pending application.

In the said drawings:

Fig. 2 is a side elevation looking from the right of Fig 1; and

Figs. 3 and 4 are detail views which will be later described.

Figure 1:
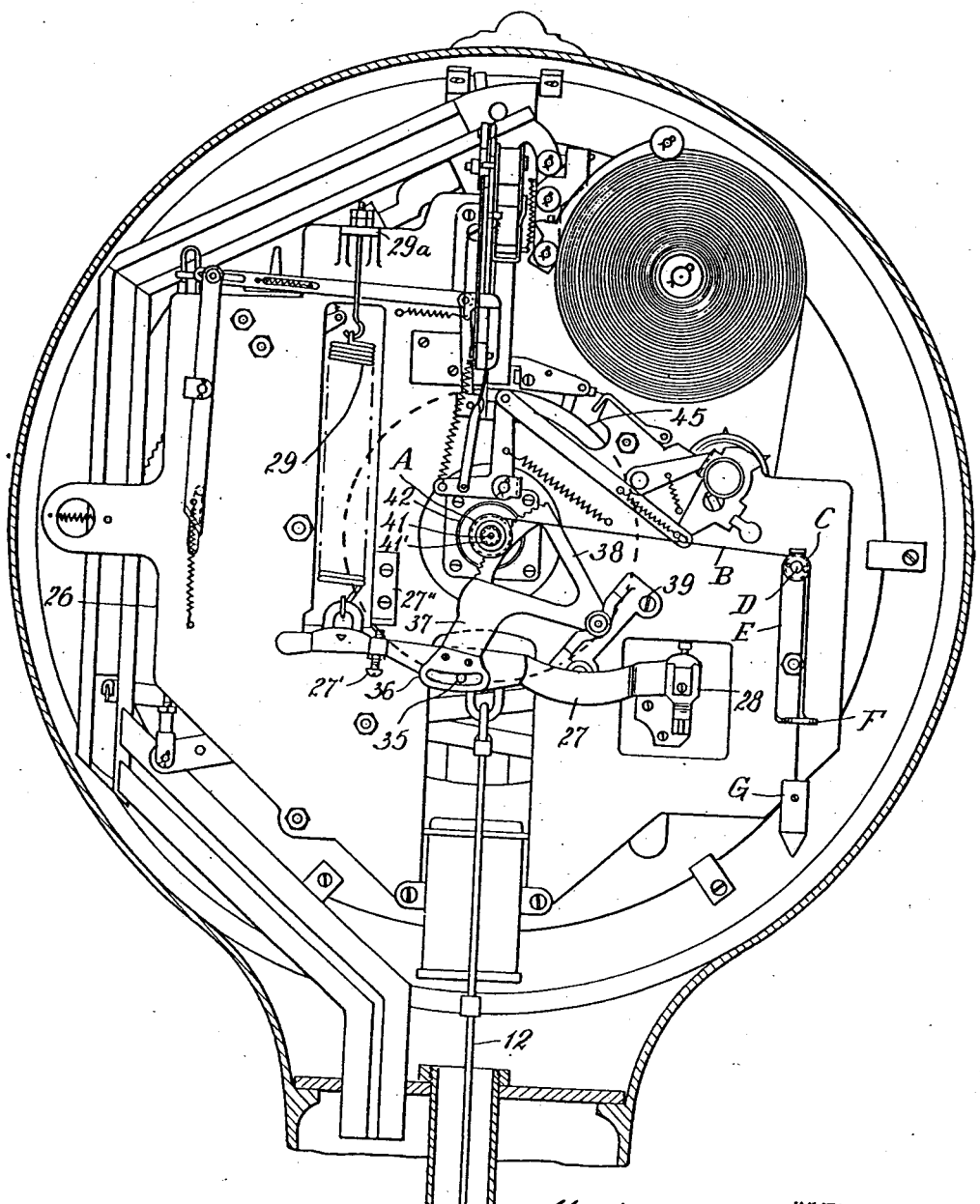
Fig. 1 is an elevational view of a printing and weighing mechanism with my improvement attached, looking from the rear.

Referring to the drawings, particularly Fig. 1, 27 is the scale beam which is supported at one end in knife bearings 28 and is secured at the other end to the lower end of spring 29. The upper end of spring 29 is adjustably supported on a bracket 29ᵃ and the "zero" or minimum weight position of the scale bar is determined by an adjusting screw 27' threaded through the scale bar and working against a stop 27" attached to the main plate 26 on which the mechanism is mounted. The scale beam 27 is depressed against the tension of the spring by means of a rod 12 connected with the scale platform, not shown.

The printing wheel 45 which is shown in dotted lines in Fig. 1 is attached to the shaft 41 mounted for free rotation in ball bearings, one of which is shown at 42 in Fig. 1. The shaft carries on its upper end a pinion 41' meshing with a rack segment 38 mounted for oscillation on the bracket 39 secured to the plate 26. The rack segment 38 has a downwardly extending arm or projection 37 to which is attached the so-called scaling bar 36 through the medium of which the movement of the scale beam 27 is transmitted to the rack segment by means of a pin 35 carried by the scale beam and projected into an arcuate slot in the scaling bar. The purpose of the scaling bar is to permit each scale to be individually adjusted for accuracy throughout its entire range of movement, this adjustment being accomplished by filing the upper edge of the slot of the scaling bar which bears on the pin 35, to the exact shape necessary to effect an equal movement of the printing lever for each pound of weight added to the scale platform, irrespective of variations in the movement of the scale beam at different points throughout its range of movement.

The mechanism so far described is the same as disclosed in my above-mentioned co-pending application, the reference characters heretofore used being for convenience the same as those employed for corresponding parts in said application. Notwithstanding the provision of the sealing bar as above described, the scale will not always accurately print the weight of the person on the beam, for the reason heretofore explained, namely, the oscillation of the printing wheel which may be caught by the printing hammer at one end or the other of the amplitude of movement unavoidable in a mechanism of this kind.

The mechanism of the present improvement by which this defect is overcome comprises a pulley wheel A attached to the end of the shaft 41, the pulley wheel having a deep peripheral groove for receiving a light cord B in such position that the cord is wound almost completely around the pulley wheel when the scale is at its zero or minimum weight position.

The cord B passes from the pulley wheel A to pulley C which is mounted for free rotation on a pin D carried by a bracket E supported on the main plate 26 in the position shown in Fig. 1. The bracket E is turned outwardly at its lower end as shown at F and in the outwardly projecting end a hole is pierced in line with the pulley C. The cord B is threaded through the hole in the part F and attached to the end of the cord is a weight G. The upper end of the bracket E is bent over the top of the pulley C to thereby hold the cord in place in the groove of the pulley.

The operation of the attachment is as follows: The weight G acting through the cord B tends to constantly turn the shaft 41 to the right or in a clockwise direction, as appears in Fig. 3, thereby holding the teeth of the pinion against the upper face of the teeth of the rack segment and also holding the upper edge of the slot in the sealing bar against the pin 35 on the scale beam. The value of the weight G is so proportioned with regard to the weight of the printing wheel as to quickly absorb the oscillation set up in the printing wheel as the scale comes to rest, so that the weight printed on the ticket will always be the weight corresponding to the position of the wheel with all the lost motion taken up in the manner described.

By connecting the weight in the manner described to the shaft of the printing wheel, the pull of the weight tending to move the wheel is the same in all positions of the wheel, and as there is substantially no frictional resistance to the movement of the cord, the scale, when once accurately adjusted will remain so indefinitely.

I claim:

1. In a weighing and ticket-printing machine, a weighing mechanism comprising a member whose position is determined by the weight on the scale, a printing wheel, means for transmitting the motion of said member to the wheel comprising a sealing mechanism having lost motion therein, and means for taking up the lost motion in the sealing mechanism when the parts come to rest.

2. In a weighing and ticket-printing machine, a weighing mechanism comprising a member whose position is determined by the weight on the scale, a printing wheel, means for transmitting the motion of said member to the wheel comprising a sealing mechanism having co-acting parts having rubbing contact, and means for holding said parts in contact when the printing wheel comes to rest.

3. In a weighing and ticket-printing machine, the combination of a scale bar whose position is determined by the weight on the scale, a printing wheel, a pinion carried by said printing wheel for actuating same, a rack meshing with said pinion and actuated by said scale bar, a pulley attached to said printing wheel coaxially with said pinion, a bracket attached to the frame of said machine at one side of the axis of said printing wheel, a cord attached to said pulley, a guide for said cord carried by said bracket, and a weight attached to said cord and tending to rotate said printing wheel in a direction to maintain the teeth of the pinion in contact with one face of the teeth of said rack.

4. In a weighing and ticket-printing machine, the combination on a scale bar whose position is determined by the weight of the scale, a printing wheel, a pinion carried by said printing wheel for actuating the same, a rack meshing with said pinion and actuated by said scale bar, a pulley attached to said printing wheel coaxially with said pinion, a cord attached to said pulley, a guide for said cord attached to the frame of said machine at one side of the axis of said printing wheel, and a weight attached to said cord and tending to rotate said printing wheel in a direction to maintain the teeth of the pinion in contact with one face of the teeth of said rack.

In testimony whereof I affix my signature.

GUSTAV F. HOCHRIEM.